US012790479B2

(12) United States Patent
Kim et al.

(10) Patent No.: US 12,790,479 B2

(45) Date of Patent: Nov. 10, 2026

(54) THERMOPLASTIC RESIN COMPOSITION, METHOD OF PREPARING THE SAME, AND MOLDED ARTICLE INCLUDING THE SAME

(71) Applicant: LG CHEM, LTD., Seoul (KR)

(72) Inventors: Min Jung Kim, Daejeon (KR); Yong Yeon Hwang, Daejeon (KR); Bong Keun Ahn, Daejeon (KR); Jangwon Park, Daejeon (KR); Jiyoon Jeon, Daejeon (KR); Eunji Lee, Daejeon (KR); Seyong Kim, Daejeon (KR); Gyeongdong Yeom, Daejeon (KR)

(73) Assignee: LG CHEM, LTD., Seoul (KR)

( * ) Notice: Subject to any disclaimer, the term of this patent is extended or adjusted under 35 U.S.C. 154(b) by 359 days.

(21) Appl. No.: 18/291,559

(22) PCT Filed: Jul. 24, 2023

(86) PCT No.: PCT/KR2023/010630

§ 371 (c)(1),
(2) Date: Jan. 23, 2024

(87) PCT Pub. No.: WO2024/085369

PCT Pub. Date: Apr. 25, 2024

(65) Prior Publication Data

US 2025/0092245 A1 Mar. 20, 2025

(30) Foreign Application Priority Data

Oct. 21, 2022 (KR) ........................ 10-2022-0136778
Jul. 14, 2023 (KR) ........................ 10-2023-0091902

(51) Int. Cl.
*C08L 51/04* (2006.01)
*C08J 3/12* (2006.01)

(52) U.S. Cl.
CPC ............... *C08L 51/04* (2013.01); *C08J 3/126* (2013.01); *C08J 2351/04* (2013.01); *C08J 2425/06* (2013.01); *C08J 2425/12* (2013.01); *C08J 2471/12* (2013.01); *C08L 2205/035* (2013.01); *C08L 2205/22* (2013.01); *C08L 2207/20* (2013.01); *C08L 2207/53* (2013.01)

(58) Field of Classification Search
CPC ............... C08L 51/04; C08L 2205/035; C08L 2205/22; C08L 2207/20; C08L 2207/53; C08L 25/06; C08L 2205/03; C08L 71/12; C08L 25/12; C08J 3/126; C08J 2351/04; C08J 2425/06; C08J 2425/12; C08J 2471/12
See application file for complete search history.

(56) References Cited

U.S. PATENT DOCUMENTS

| | | | | | |
|---|---|---|---|---|---|
| 4,128,602 | A * | 12/1978 | Katchman | C08L 51/04 525/905 |
| 4,423,187 | A * | 12/1983 | Brandstetter | C08L 51/04 525/289 |
| 5,200,432 | A | 4/1993 | Bopp et al. | |
| 5,686,528 | A * | 11/1997 | Wills | C08L 71/123 525/902 |
| 5,958,316 | A | 9/1999 | Giintherberg et al. | |
| 2015/0094414 | A1* | 4/2015 | Lee | C08L 51/04 524/504 |
| 2016/0032092 | A1 | 2/2016 | Yamaguchi | |
| 2022/0010120 | A1 | 1/2022 | Atsuta | |

FOREIGN PATENT DOCUMENTS

| | | | |
|---|---|---|---|
| CN | 114502646 | A | 5/2022 |
| EP | 3 916 051 | A1 | 12/2021 |
| EP | 4 006 102 | A1 | 6/2022 |
| JP | H07-258514 | A | 10/1995 |
| JP | 2008-156585 | A | 7/2008 |
| JP | 4556503 | B2 | 10/2010 |
| JP | 2013-014702 | A | 1/2013 |
| JP | 5752505 | B2 * | 7/2015 |
| JP | 2019-523802 | A | 8/2019 |
| JP | 2021-503534 | A | 2/2021 |
| JP | 2021-38362 | A | 3/2021 |
| KR | 10-0372213 | B1 | 3/2003 |
| KR | 10-2009-0040111 | A | 4/2009 |
| KR | 10-2009-0073702 | A | 7/2009 |
| KR | 10-2011-0120146 | A | 11/2011 |
| KR | 10-2012-0129074 | A | 11/2012 |
| KR | 10-1271250 | B1 | 6/2013 |
| KR | 10-2019-0057169 | A | 5/2019 |
| KR | 10-2024-0050724 | A | 4/2024 |
| TW | 202237736 | A | 10/2022 |
| WO | 2004/005001 | A1 | 1/2004 |

OTHER PUBLICATIONS

English translation JP5752505B2 (Year: 2015).*
The Extended European Search Report for European Patent Application No. 23843972.3, dated Nov. 15, 2024.

* cited by examiner

*Primary Examiner* — Alicia Bland
(74) *Attorney, Agent, or Firm* — ROTHWELL, FIGG, ERNST & MANBECK, P.C.

(57) ABSTRACT

The present invention relates to a thermoplastic resin composition, a method of preparing the same, and a molded article including the same, and more particularly, to a thermoplastic resin composition having eco-friendliness and excellent molding processability, mechanical rigidity, heat resistance, and colorability by including a predetermined ASA-based graft copolymer and a recycled resin, a method of preparing the thermoplastic resin composition, and a molded article including the thermoplastic resin composition.

15 Claims, No Drawings

THERMOPLASTIC RESIN COMPOSITION, METHOD OF PREPARING THE SAME, AND MOLDED ARTICLE INCLUDING THE SAME

TECHNICAL FIELD

Cross-Reference to Related Applications

This application is a National Phase of International Application No. PCT/KR2023/010630 which claims priority to Korean Patent Application No. 10-2022-0136778, filed on Oct. 21, 2022, and Korean Patent Application No. 10-2023-0091902, re-filed on Jul. 14, 2023, based on the priority of the above patent, in the Korean Intellectual Property Office, the disclosures of each of which are incorporated herein by reference.

The present invention relates to a thermoplastic resin composition, a method of preparing the same, and a molded article including the same, and more particularly, to a thermoplastic resin composition having excellent physical properties such as molding processability, impact strength, tensile strength, heat resistance, and colorability eco-friendliness by including a recycled resin, a method of preparing the thermoplastic resin composition, and a molded article including the thermoplastic resin composition.

Background Art

Acrylonitrile-butadiene-styrene resins (hereinafter referred to as "ABS resins") based on conjugated diene-based rubber have been used in various fields due to excellent molding processability, mechanical physical properties, and appearance thereof. However, since ABS resins are based on butadiene rubber having unsaturated bonds that are chemically unstable, ABS resins are easily aged when exposed to UV light. That is, ABS resins have poor weather resistance. To solve these problems, acrylate compound-styrene-acrylonitrile copolymers (hereinafter referred to as "ASA resins") having excellent weather resistance have been proposed as alternative materials.

ASA resins are widely used for indoor and outdoor applications due to excellent weather resistance, aging resistance, chemical resistance, molding processability, rigidity, impact resistance, and processability thereof. Specifically, ASA resins are used in various fields such as electric/electronic parts, construction materials, automobile interior and exterior materials, ships, and leisure products.

On the one hand, plastics, which are consumed in large quantities worldwide due to convenience thereof, do not naturally decompose, and thus, demands for methods of processing and recycling plastic waste are gradually increasing. In addition, the use of recycled resins is mandated in accordance with environmental regulations.

However, recycled resins are easily aged by impact, abrasion, heat, UV, moisture, and high-temperature and low-temperature environments during manufacturing, consumption, and disposal. In addition, recycled resins often contain contaminants. Accordingly, compared to newly polymerized virgin resins, recycled resins have poor molding processability, mechanical rigidity, appearance, flexibility, chemical resistance, and thermal stability. In addition, mixing a recycled resin and a virgin resin cannot solve these problems (except for the case of using a small amount of recycled resin).

Therefore, there is an urgent need to develop a recycled resin composition that contains a certain amount of recycled resin and has physical properties applicable to the existing plastic material field.

RELATED ART DOCUMENTS

Patent Documents

KR 10-1271250 B1

DISCLOSURE

Technical Problem

Therefore, the present invention has been made in view of the above problems, and it is one object of the present invention to provide a thermoplastic resin composition having eco-friendliness by including a recycled resin and having excellent molding processability, impact strength, tensile strength, heat resistance, and colorability, a method of preparing the thermoplastic resin composition, and a molded article manufactured using the thermoplastic resin composition.

The above and other objects can be accomplished by the present invention described below.

Technical Solution

In accordance with one aspect of the present invention, provided is a thermoplastic resin composition including an alkyl acrylate-aromatic vinyl compound-vinyl cyanide compound graft copolymer (A) containing an alkyl acrylate rubber core having an average particle diameter of 60 to 200 nm and an aromatic vinyl compound-vinyl cyanide compound copolymer shell formed to surround the core; and a matrix resin (B), wherein the copolymer shell of the graft copolymer (A) includes 85 to 99% by weight of an aromatic vinyl compound and 1 to 15% by weight of a vinyl cyanide compound based on a total weight of the copolymer shell and has a weight average molecular weight of 100,000 to 400,000 g/mol, and the matrix resin (B) includes 50 to 90% by weight of recycled polystyrene and 8 to 50% by weight of a polyarylene oxide based on 100% by weight in total of the matrix resin (B).

Based on 100% by weight in total of the graft copolymer (A) and the matrix resin (B), the thermoplastic resin composition may preferably include 20 to 60% by weight of the graft copolymer (A) and 40 to 80% by weight of the matrix resin (B).

Based on 100% by weight in total of the graft copolymer (A), the graft copolymer (A) may preferably include 40 to 70% by weight of the alkyl acrylate rubber core and 30 to 60% by weight of the copolymer shell.

The graft copolymer (A) may preferably include a polymer seed including one or more selected from the group consisting of an alkyl(meth)acrylate, an aromatic vinyl compound, and a vinyl cyanide compound. In this case, the graft copolymer (A) may preferably include 1 to 20% by weight of the polymer seed, 35 to 65% by weight of the alkyl acrylate rubber core, and 30 to 60% by weight of the copolymer shell.

The recycled polystyrene may preferably include any one selected from the group consisting of recycled non-foamed polystyrene, recycled foamed polystyrene, and a mixture thereof.

The recycled polystyrene may preferably have a weight average molecular weight of 100,000 to 350,000 g/mol.

Preferably, the matrix resin (B) may further include virgin general-purpose polystyrene (GPPS). In this case, the matrix resin (B) may include 50 to 90% by weight of the recycled polystyrene, 8 to 45% by weight of the polyarylene oxide, and 1 to 30% by weight of the virgin general-purpose polystyrene.

For example, the matrix resin (B) may further include an aromatic vinyl compound-vinyl cyanide compound copolymer, preferably an aromatic vinyl compound-vinyl cyanide compound copolymer including 75 to 95% by weight of an aromatic vinyl compound and 5 to 25% by weight of a vinyl cyanide compound. In this case, based on 100% by weight in total of the matrix resin (B), the matrix resin (B) may include 1 to 15% by weight of the aromatic vinyl compound-vinyl cyanide compound copolymer.

The thermoplastic resin composition may preferably include an alkyl acrylate-aromatic vinyl compound-vinyl cyanide compound graft copolymer (C) containing an alkyl acrylate rubber core having an average particle diameter of greater than 200 nm and 500 nm or less and an aromatic vinyl compound-vinyl cyanide compound copolymer shell formed to surround the core. In this case, based on 100 parts by weight in total of the graft copolymer (A) and the matrix resin (B), the thermoplastic resin composition may include 0.1 to 12 parts by weight of the graft copolymer (C).

Based on 100 parts by weight in total of the graft copolymer (A) and the matrix resin (B), the thermoplastic resin composition may preferably include a light stabilizer (D) in an amount of 0.1 to 7 parts by weight.

The thermoplastic resin composition may preferably have a heat deflection temperature (HDT) of 82° C. or higher as measured under a load of 18.5 kgf according to ASTM D 648.

The thermoplastic resin composition may preferably have a tensile strength of 400 $kgf/cm^2$ or more as measured at a rate of 50 mm/min according to ASTM D 638.

In accordance with another aspect of the present invention, provided is a method of preparing a thermoplastic resin composition, the method including kneading and extruding an alkyl acrylate-aromatic vinyl compound-vinyl cyanide compound graft copolymer (A) containing an alkyl acrylate rubber core having an average particle diameter of 60 to 200 nm and an aromatic vinyl compound-vinyl cyanide compound copolymer shell formed to surround the core; and a matrix resin (B) at 180 to 300° C. and 100 to 400 rpm, wherein the copolymer shell of the graft copolymer (A) includes 85 to 99% by weight of an aromatic vinyl compound and 1 to 15% by weight of a vinyl cyanide compound based on 100% by weight in total of the copolymer shell and has a weight average molecular weight of 100,000 to 400,000 g/mol, and the matrix resin (B) includes 50 to 90% by weight of recycled polystyrene and 8 to 50% by weight of a polyarylene oxide based on 100% by weight in total of the matrix resin (B).

In accordance with yet another aspect of the present invention, provided is a molded article including the thermoplastic resin composition.

Advantageous Effects

According to the present invention, the present invention has an effect of providing a thermoplastic resin composition having eco-friendliness by including an ASA-based resin composition and a recycled resin and having excellent molding processability, impact strength, tensile strength, heat resistance, and colorability, a method of preparing the thermoplastic resin composition, and a molded article manufactured using the thermoplastic resin composition.

Best Mode

Hereinafter, a thermoplastic resin composition of the present invention, a method of preparing the same, and a molded article including the same will be described in detail.

The present inventors confirmed that, while researching to prepare an eco-friendly ASA-based resin composition containing a recycled resin and having physical properties equal or superior to those of conventional virgin ASA resin-based compositions, when adjusting the size and composition of the rubber core and shell of a virgin ASA resin added in a certain amount and adjusting the composition ratio between a recycled resin and the virgin resin, physical properties such as molding processability, impact strength, and heat resistance were greatly improved. Based on these results, the present inventors conducted further studies to complete the present invention.

The thermoplastic resin composition of the present invention includes an alkyl acrylate-aromatic vinyl compound-vinyl cyanide compound graft copolymer (A) containing an alkyl acrylate rubber core having an average particle diameter of 60 to 200 nm and an aromatic vinyl compound-vinyl cyanide compound copolymer shell formed to surround the core; and a matrix resin (B), wherein the copolymer shell of the graft copolymer (A) includes 85 to 99% by weight of an aromatic vinyl compound and 1 to 15% by weight of a vinyl cyanide compound based on 100% by weight in total of the copolymer shell and has a weight average molecular weight of 100,000 to 400,000 g/mol, and the matrix resin (B) includes 50 to 90% by weight of recycled polystyrene and 8 to 50% by weight of a polyarylene oxide based on 100% by weight in total of the matrix resin (B). In this case, eco-friendliness may be obtained by including the recycled resin, and molding processability, impact strength, tensile strength, heat resistance, and colorability may be excellent.

In the present disclosure, the component ratio of the copolymer or resin may mean the content of units constituting the copolymer, or the content of monomers introduced during polymerization of the copolymer.

In the present disclosure, a polymer including a certain compound means a polymer prepared by polymerizing the compound, and a unit in the polymer is derived from the compound.

In the present disclosure, when a recycled thermoplastic resin conforms to the definition of the present invention and is recognized as a conventional recycled thermoplastic resin in the art to which the present invention pertains, the recycled thermoplastic resin may be used in the present invention without particular limitation. For example, the recycled thermoplastic resin is a thermoplastic resin recycled from collected waste plastics. As a specific example, the recycled thermoplastic resin refers to a raw material obtained by sorting, washing, and crushing collected waste plastics. In addition, when necessary, the recycled thermoplastic resin may be processed into pellets through an extrusion process. In this case, no additional processing such as additional purification is required. Since the recycled thermoplastic resin has been processed one or more times, residual additives such as a colorant, a lubricant, and/or a release agent may be included.

In the present disclosure, a non-recycled thermoplastic resin contrasts with the recycled thermoplastic resin above described, and may be prepared by polymerizing monomers constituting a thermoplastic resin or may be a commercially available product corresponding thereto. For example, the non-recycled thermoplastic resin may be referred to as a virgin resin.

Hereinafter, the thermoplastic resin composition of the present invention will be described in detail for each component.

(A) Alkyl Acrylate-Aromatic Vinyl Compound-Vinyl Cyanide Compound Graft Copolymer For example, based on 100% by weight in total of the graft copolymer (A) and the matrix resin (B), the alkyl acrylate rubber-aromatic vinyl compound-vinyl cyanide compound graft copolymer (A) (hereinafter referred to as "graft copolymer (A)") containing a rubber core having an average particle diameter of 60 to 200 nm may be included in an amount of 20 to 65% by weight or 20 to 60% by weight, preferably 25 to 60% by weight, more preferably 30 to 58% by weight, still more preferably 35 to 55% by weight. In this case, eco-friendliness may be obtained, and molding processability, impact strength, tensile strength, heat resistance, and colorability may be excellent.

For example, based on 100% by weight in total of the graft copolymer (A) and the matrix resin (B), the graft copolymer (A) may be included in an amount of 40 to 58% by weight, preferably 40 to 55% by weight, more preferably 40 to 50% by weight. In this case, eco-friendliness, molding processability, tensile strength, and heat resistance may be excellent.

For example, based on 100% by weight in total of the graft copolymer (A) and the matrix resin (B), the graft copolymer (A) may be included in an amount of 45 to 60% by weight, preferably 48 to 60% by weight, more preferably 50 to 60% by weight. In this case, impact strength and colorability may be excellent.

For example, the graft copolymer (A) may include an alkyl acrylate rubber core having an average particle diameter of 60 to 200 nm and including an alkyl acrylate compound; and an aromatic vinyl compound-vinyl cyanide compound copolymer shell formed to surround the rubber core and including an aromatic vinyl compound and a vinyl cyanide compound. Based on 100% by weight in total of the copolymer shell, the copolymer shell may include 85 to 99% by weight of an aromatic vinyl compound and 1 to 15% by weight of a vinyl cyanide compound and may have a weight average molecular weight of 100,000 to 400,000 g/mol. In this case, even including a resin, molding recycled processability, impact strength, tensile strength, heat resistance, and colorability may be excellent.

In the present disclosure, the average particle diameter of the polymer seed, rubber core, or graft shell of the graft copolymer may be measured using electron microscopic measurement methods using SEM or TEM commonly used in the art to which the present invention pertains, without particular limitation. For example, for each of the polymer seed, the rubber core, and the graft shell, upon completion of preparation thereof, a sample is obtained, and the average particle diameter of the sample is measured by dynamic light scattering. Specifically, the average particle diameter is measured as an intensity value using a Nicomp 380 particle size analyzer (manufacturer: PSS) in a Gaussian mode. As a specific measurement example, a sample is prepared by diluting 0.1 g of latex (total solids content: 35 to 50 wt %) 1,000 to 5,000-fold with distilled water, i.e., a sample is diluted appropriately so as not to deviate significantly from an intensity setpoint of 300 kHz, and the sample is placed in a glass tube. Then, the average particle diameter of the sample is measured using a flow cell in auto-dilution in a measurement mode of dynamic light scattering/intensity 300 kHz/intensity-weight Gaussian analysis. At this time, setting values are as follows: temperature: 23° C. and measurement wavelength: 632.8 nm.

In the present disclosure, unless otherwise defined, the weight average molecular weight may be measured using gel permeation chromatography (GPC, Waters Breeze). As a specific example, the weight average molecular weight may be measured using tetrahydrofuran (THE) as an eluate through gel permeation chromatography (GPC, Waters Breeze). In this case, weight average molecular weight is obtained as a relative value to a polystyrene (PS) standard sample. As a specific measurement example, the weight average molecular weight may be measured under conditions of solvent: THE, column temperature: 40° C., flow rate: 0.3 ml/min, sample concentration: 20 mg/ml, injection amount: 5 μl, column model: 1×PLgel 10 μm MiniMix-B (250× 4.6 mm)+1×PLgel 10 μm MiniMix-B (250×4.6 mm)+ 1×PLgel 10 μm MiniMix-B Guard (50× 4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

In the present disclosure, to measure the weight average molecular weight of the copolymer (shell) grafted onto the rubber (core), the rubber (core) may be separated by a separation method used in the art to which the present invention pertains. For example, a sol is separated from insoluble matter (gel), and a solution is prepared by dissolving the sol in a THF solvent using a method for measuring a grafting degree to be described later. Then, the solution is filtered through a filter to obtain a filtrate, and the filtrate is used as a sample for measuring weight average molecular weight.

For example, based on 100% by weight in total of the graft copolymer (A), the graft copolymer (A) may include 40 to 70% by weight of an alkyl acrylate rubber core and 30 to 60% by weight of an aromatic vinyl compound-vinyl cyanide compound copolymer shell, preferably 40 to 65% by weight of an alkyl acrylate rubber core and 35 to 60% by weight of a copolymer shell, more preferably 42 to 63% by weight of an alkyl acrylate rubber core and 37 to 58% by weight of a copolymer shell, still more preferably 45 to 60% by weight of an alkyl acrylate rubber core and 40 to 55% by weight of a copolymer shell. In this case, compatibility with the matrix resin may be improved, thereby improving molding processability, impact strength, tensile strength, heat resistance, and colorability.

For example, the graft copolymer (A) may include a polymer seed including one or more selected from the group consisting of an alkyl(meth)acrylate, an aromatic vinyl compound, and a vinyl cyanide compound; an alkyl acrylate rubber core formed to surround the polymer seed; and an aromatic vinyl compound-vinyl cyanide compound copolymer shell formed to surround the rubber core. As a specific example, based on a total weight of the graft copolymer (A), the graft copolymer (A) may include 1 to 20% by weight of the polymer seed, 35 to 65% by weight of the alkyl acrylate rubber core, and 30 to 60% by weight of the copolymer shell, preferably 2 to 18% by weight of the polymer seed, 38 to 63% by weight of the alkyl acrylate rubber core, and 30 to 60% by weight of the copolymer shell, more preferably 3 to 15% by weight of the polymer seed, 40 to 60% by weight of the alkyl acrylate rubber core, and 35 to 55% by weight of the copolymer shell, still more preferably 5 to 10% by weight of the polymer seed, 40 to 57% by weight of the alkyl acrylate rubber core, and 35 to 52% by weight of the copolymer shell. In this case, compatibility with the matrix resin may be improved, thereby greatly improving molding processability, impact strength, and gloss.

For example, the polymer seed may include an alkyl acrylate, an aromatic vinyl compound, and a vinyl cyanide compound, preferably an alkyl acrylate. In this case, molding processability, impact strength, tensile strength, heat resistance, and colorability may be improved.

As another example, the polymer seed may include one or more selected from the group consisting of an alkyl methacrylate, an aromatic vinyl compound, and a vinyl cyanide compound, and may preferably include an aromatic vinyl compound and a vinyl cyanide compound. As a specific example, based on a total weight of the polymer seed, the polymer seed may include 50 to 90% by weight of an aromatic vinyl compound and 10 to 50% by weight of a vinyl cyanide compound, preferably 55 to 85% by weight of an aromatic vinyl compound and 15 to 45% by weight of a vinyl cyanide compound, more preferably 60 to 80% by weight of an aromatic vinyl compound and 20 to 40% by weight of a vinyl cyanide compound. Within this range, appearance qualities such as gloss and colorability, mechanical properties, and molding processability may be excellent.

For example, the polymer seed of the graft copolymer (A) may have an average particle diameter of 40 to 140 nm, preferably 50 to 100 nm, more preferably 60 to 90 nm. The average particle diameter of the polymer seed is smaller than that of the rubber core surrounding the polymer seed. Within this range, molding processability, impact strength, tensile strength, resistance, and colorability may be excellent.

For example, the rubber core of the graft copolymer (A) may have an average particle diameter of 60 to 200 nm, preferably 65 to 170 nm, more preferably 70 to 150 nm, still more preferably 80 to 120 nm, as a preferred example, 100 to 150 nm. When the rubber core includes the polymer seed, the average particle diameter of the rubber core is larger than that of the polymer seed. Within this range, molding processability, impact strength, tensile strength, heat resistance, and colorability may be excellent.

In the present disclosure, when the rubber core includes the seed, the average particle diameter of the rubber core means the average particle diameter of the rubber core including the seed.

For example, the graft shell of the graft copolymer (A) may include 85 to 99% by weight of an aromatic vinyl compound and 1 to 15% by weight of a vinyl cyanide compound, preferably 85 to 98% by weight of an aromatic vinyl compound and 2 to 15% by weight of a vinyl cyanide compound, more preferably 90 to 98% by weight of an aromatic vinyl compound and 2 to 10% by weight of a vinyl cyanide compound. Within this range, molding processability, impact strength, and gloss may be excellent.

For example, the graft shell of the graft copolymer (A) may have a weight average molecular weight of 100,000 to 400,000 g/mol, preferably 110,000 to 395,000 g/mol, more preferably 120,000 to 350,000 g/mol, still more preferably 130,000 to 300,000 g/mol. Within this range, molding processability, impact strength, and gloss may be excellent.

In the present disclosure, an alkyl(meth)acrylate may be defined as a range that includes both an alkyl acrylate and an alkyl methacrylate.

In the present disclosure, for example, the alkyl acrylate may be an alkyl acrylate containing an alkyl group having 1 to 15 carbon atoms, and may preferably include one or more selected from the group consisting of methyl acrylate, ethyl acrylate, propyl acrylate, butyl acrylate, 2-ethylbutyl acrylate, octyl acrylate, 2-ethylhexyl acrylate, hexyl acrylate, heptyl acrylate, n-pentyl acrylate, and lauryl acrylate. More preferably, the alkyl acrylate may be an alkyl acrylate containing an alkyl group having 1 to 4 carbon atoms, still more preferably n-butylacrylate, 2-ethylhexyl acrylate, or a mixture thereof, still more preferably butyl acrylate.

In the present disclosure, for example, the alkyl methacrylate may be an alkyl methacrylate containing an alkyl group having 1 to 15 carbon atoms, and may preferably include one or more selected from the group consisting of methyl methacrylate, ethyl methacrylate, butyl methacrylate, 2-ethylbutyl methacrylate, 2-ethylhexylmethacrylate, and lauryl methacrylate. More preferably, the alkyl methacrylate may be an alkyl methacrylate containing an alkyl group having 1 to 4 carbon atoms, still more preferably methyl methacrylate.

In the present disclosure, for example, the aromatic vinyl compound may include one or more selected from the group consisting of styrene, x-methyl styrene, o-methyl styrene, ρ-methyl styrene, m-methyl styrene, ethyl styrene, isobutyl styrene, t-butyl styrene, o-bromostyrene, ρ-bromostyrene, m-bromostyrene, o-chlorostyrene, ρ-chlorostyrene, m-chlorostyrene, vinyltoluene, vinylxylene, fluorostyrene, and vinylnaphthalene, preferably styrene.

In the present disclosure, for example, the vinyl cyanide compound may include one or more selected from the group consisting of acrylonitrile, methacrylonitrile, ethylacrylonitrile, and isopropylacrylonitrile, preferably acrylonitrile.

For example, the grafting degree of the graft copolymer (A) may be 20% or more, preferably 20 to 100%, more preferably 25 to 80%, still more preferably 30 to 70%, still more preferably 30 to 60%. Within this range, mechanical properties, such as impact resistance, and weather resistance may be excellent.

In the present disclosure, when measuring grafting degree, 30 g of acetone is added to 0.5 g of a powdered graft copolymer, agitation is performed at 210 rpm and room temperature for 12 hours using a shaker (SKC-6075, Lab Companion Co.), centrifugation is performed at 18,000 rpm and 0° C. for 3 hours using a centrifuge (Supra R30, Hanil Science Co.) to separate only insoluble matter (gel) that is not dissolved in acetone, and the separated insoluble matter is dried via forced circulation at 85° C. for 12 hours using a forced convection oven (OF-12GW, Lab Companion Co.). Then, the weight of the dried insoluble matter is measured, and grafting degree is calculated by Equation 1 below.

$$\text{Grafting degree (\%)} = [\text{Weight (g) of grafted monomers}/\text{Weight (g) of rubber}] \times 100 \quad \text{[Equation 1]}$$

In Equation 1, the weight (g) of grafted monomers is a value obtained by subtracting the weight (g) of rubber from the weight (g) of insoluble matter obtained by dissolving a graft copolymer in acetone and performing centrifugation, and the weight (g) of rubber is the weight (g) of rubber components theoretically included in the graft copolymer powder.

For example, a method of preparing the graft copolymer (A) may include step i) of preparing an alkyl acrylate rubber core by including an alkyl acrylate; and step ii) of preparing a graft copolymer by graft-polymerizing an aromatic vinyl compound and a vinyl cyanide compound in the presence of the rubber core. In this case, molding processability, impact strength, and gloss may be excellent.

Based on 100% by weight in total of the graft copolymer (A), the method of preparing the graft copolymer (A) may preferably include step i) of preparing a rubber core by polymerizing 40 to 70% by weight of an alkyl acrylate, a crosslinking agent, an initiator, and an emulsifier; and step ii) of preparing a graft copolymer by graft-polymerizing 30 to 60% by weight in total of an aromatic vinyl compound and a vinyl cyanide compound, a crosslinking agent, an initiator, and an emulsifier in the presence of the rubber core. In this case, molding processability, impact strength, and gloss may be excellent.

For example, the method of preparing the graft copolymer (A) may include step i) of preparing a polymer seed by including one or more selected from the group consisting of an alkyl(meth)acrylate, an aromatic vinyl compound, and a vinyl cyanide compound; step ii) of preparing an alkyl acrylate rubber core by including an alkyl acrylate in the presence of the polymer seed; and step iii) of preparing a graft copolymer by graft-polymerizing an aromatic vinyl compound and a vinyl cyanide compound in the presence of the rubber core. In this case, molding processability, impact strength, and gloss may be excellent.

Based on 100% by weight in total of the graft copolymer (A), the method of preparing the graft copolymer (A) may preferably include step i) of preparing a polymer seed by polymerizing 1 to 20% by weight of one or more selected from the group consisting of an alkyl(meth)acrylate, an aromatic vinyl compound, and a vinyl cyanide compound, an electrolyte, a crosslinking agent, an initiator, and an emulsifier; step ii) of preparing a rubber core by polymerizing 35 to 65% by weight of an alkyl acrylate, a crosslinking agent, an initiator, and an emulsifier in the presence of the polymer seed; and step iii) of preparing a graft copolymer by graft-polymerizing 30 to 60% by weight of and aromatic vinyl compound and a vinyl cyanide compound, a crosslinking agent, an initiator, and an emulsifier in the presence of the rubber core. In this case, molding processability, impact strength, and gloss may be excellent.

In the present disclosure, the content of a monomer in a polymer may mean a content (wt %) of the monomer fed when the polymer is prepared, or may mean a value (wto) calculated by converting a unit in the polymer into the monomer.

As the emulsifiers used in the step of preparing a polymer seed (when including a polymer seed), the step of preparing a rubber core, and the step of preparing a copolymer shell, emulsifiers commonly used in the art to which the present invention pertains may be used without particular limitation. For example, the emulsifiers may include one or more selected from the group consisting of an alkyl sulfosuccinate metal salt having 12 to 18 carbon atoms or a derivative thereof, an alkyl sulfate ester having 12 to 20 carbon atoms or a derivative thereof, an alkyl sulfonic acid metal salt having 12 to 20 carbon atoms or a derivative thereof, fatty acid soap, and rosin acid soap.

The alkyl sulfosuccinate metal salt having 12 to 18 carbon atoms or the derivative thereof may preferably include one or more selected from the group consisting of dicyclohexyl sulfosuccinate, dihexyl sulfosuccinate, di-2-ethyl hexyl sulfosuccinate sodium salt, di-2-ethyl hexyl sulfosuccinate potassium salt, dioctyl sulfosuccinate sodium salt, and dioctyl sulfosuccinate potassium salt.

The alkyl sulfate ester having 12 to 20 carbon atoms or the derivative thereof may preferably include one or more selected from the group consisting of sodium lauryl sulfate, sodium dodecyl sulfate, sodium dodecyl benzene sulfate, sodium octadecyl sulfate, sodium oleic sulfate, potassium dodecyl sulfate, and potassium octadecyl sulfate.

The fatty acid soap may preferably include one or more selected from the group consisting of oleic acid, stearic acid, lauric acid, and sodium or potassium salts of mixed fatty acids.

The rosin acid soap may preferably be an abietic acid salt, specifically an abietic metal salt.

For example, based on 100 parts by weight in total of the graft copolymer (A), the emulsifier may be used in an amount of 0.01 to 5 parts by weight, preferably 0.1 to 4 parts by weight, more preferably 1 to 3 parts by weight.

As the initiator, a radical initiator may be used without particular limitation.

For example, the radical initiator may include one or more selected from the group consisting of inorganic peroxides, organic peroxides, peroxyketal peroxides, peroxycarbonate peroxides, and azo compounds.

The inorganic peroxides may preferably include one or more selected from the group consisting of sodium persulfate, potassium persulfate, ammonium persulfate, potassium superphosphate, and hydrogen peroxide.

For example, the organic peroxides may include one or more selected from the group consisting of t-butyl peroxide, cumene hydroperoxide, p-menthane hydroperoxide, di-t-butyl peroxide, dicumyl peroxide, t-butylcumyl peroxide, 2,5-dimethyl-2,5-di(t-butyl peroxy) hexane, di-t-amyl peroxide, 1,1-di(t-butylperoxy)-3,3,5-trimethylcyclohexane, 1,1-di(t-butylperoxy)-cyclohexane, 1,1-di(t-amylperoxy)-cyclohexane, ethyl 3,3-di(t-amylperoxy)-butyrate, diisopropyl benzene mono-hydroperoxide, t-amyl hydroperoxide, t-butyl hydroperoxide, t-butyl peroxyneodecanoate, t-butyl peroxypivalate, di-(3,3,5-trimethylhexanoyl)-peroxide, t-butyl peroxy-2-ethylhexanoate, t-butyl peroxy-3,3,5-trimethylhexanoyl, t-amyl peroxy neodecanoate, t-amyl peroxy pivalate, t-amyl peroxy-2-ethylhexanoate, t-butyl peroxyacetate, t-butyl peroxybenzoate, t-amyl peroxy 2-ethylhexyl carbonate, t-butyl peroxy 2-ethylhexyl carbonate, t-butyl peroxy isopropyl monocarbonate, t-butyl peroxy maleic acid, cumyl peroxyneodecanoate, 1,1,3,3-tetramethylbutyl peroxy neodecanoate, 1,1,3,3-tetramethylbutyl peroxy 2-ethylhexanoate, di-2-2ethylhexyl peroxydicarbonate, 3-hydroxy-1,1-dimethylbutylperoxyneodecanoate, acetyl peroxide, isobutyl peroxide, octanoyl peroxide, dibenzoyl peroxide, dilauroyl peroxide, 3,5,5-trimethylhexanol peroxide, and t-butyl peroxy isobutyrate.

The peroxyketal peroxides may preferably include one or more selected from the group consisting of 1,1-di(t-butylperoxy)-3,3,5-trimethylcyclohexane, 1,1-di(t-butylperoxy) cyclohexane, 1,1-di(t-amylperoxy)cyclohexane, ethyl-3,3-di (t-butylperoxy) butyrate, and ethyl-3,3-di(t-amylperoxy) butyrate.

The peroxycarbonate peroxides may preferably include one or more selected from the group consisting of dialkylperoxides such as dicumylperoxide, di(t-butylperoxy)-m/p-diisopropylbenzene, 2,5-dimethyl-2,5-(t-butylperoxy) hexane, t-butylcumyl peroxide, and 2,5-methyl-2,5-(t-butylperoxy) hexane-3, t-butyl peroxy 2-ethylhexyl mono carbonate, and t-butyl peroxybenzoate.

The azo compounds may preferably include azobis isobutyronitrile, azobis-2,4-dimethylvaleronitrile, azobiscyclohexanecarbonylnitrile, and azobis isobutyric acid methyl.

In at least one step among the step of preparing a polymer seed (when including a polymer seed), the step of preparing a rubber core, and the step of preparing a copolymer shell, an oxidation-reduction catalyst may preferably be used in combination with the initiator to further accelerate an initiation reaction.

For example, the oxidation-reduction catalyst may include one or more selected from the group consisting of sodium pyrophosphate, dextrose, ferrous sulfide, sodium sulfite, sodium formaldehyde sulfoxylate, and sodium ethylenediaminetetraacetate, and may preferably be a mixture of sodium pyrophosphate, dextrose, and ferrous sulfide, but the present invention is not limited thereto.

In at least one step among the step of preparing a polymer seed (when including a polymer seed), the step of preparing a rubber core, and the step of preparing a copolymer shell, an activator may preferably be used in combination with the polymerization initiator to accelerate the initiation reaction of peroxides.

As the activator, activators commonly used in the art to which the present invention pertains may be used without particular limitation.

Based on 100 parts by weight in total of the graft copolymer (A), the activator may be added in an amount of 0.01 to 3 parts by weight, preferably 0.01 to 1 part by weight. Within this range, a high degree of polymerization may be achieved.

For example, the electrolyte may include one or more selected from the group consisting of KCl, NaCl, $KHCO_3$, $NaHCO_3$, $K_2CO_3$, $Na_2CO_3$, $KHSO_3$, $NaHSO_4$, $Na_2S_2O_7$, $K_3P_2O_7$, $K_3PO_4$, $Na_3PO_4$, KOH, NaOH, and $Na_2HPO_4$, but the present invention is not limited thereto.

Based on 100 parts by weight in total of the graft copolymer (A), the electrolyte may be added in an amount of 0.001 to 1 part by weight, preferably 0.01 to 0.5 parts by weight. Within this range, a high degree of polymerization may be achieved.

In the present disclosure, unless otherwise defined, crosslinking agents commonly used in the art to which the present invention pertains may be used as the crosslinking agent of the present invention without particular limitation. For example, a compound including an unsaturated vinyl group and being capable of serving as a crosslinking agent or a compound including two or more unsaturated vinyl groups having different reactivities may be used as the crosslinking agent of the present invention. As a specific example, the crosslinking agent of the present invention may include one or more selected from the group consisting of polyethyleneglycol diacrylate, polyethyleneglycol dimethacrylate, polypropyleneglycol diacrylate, polypropyleneglycol dimethacrylate, ethyleneglycol diacrylate, ethyleneglycol dimethacrylate, divinylbenzene, diethyleneglycol dimethacrylate, triethyleneglycol dimethacrylate, 1,3-butadiol dimethacrylate, hexanediol propoxylate diacrylate, neopentylglycol dimethacrylate, neopentylglycol 1 ethoxylate diacrylate, neopentylglycol propoxylate diacrylate, trimethylolpropane trimethacrylate, trimethylolmethane triacrylate, trimethylpropane ethoxylate triacrylate, trimethylpropane propoxylate triacrylate, pentaerythritol ethoxylate triacrylate, pentaerythritol propoxylate triacrylate, vinyltrimethoxysilane, allyl methacrylate, triallyl isocyanurate, triallyl amine, and diallyl amine, without being limited thereto.

For example, based on 100 parts by weight in total of the graft copolymer (A), the crosslinking agent may be used in an amount of 0.01 to 5 parts by weight, preferably 0.01 to 3 parts by weight, more preferably 0.1 to 1 part by weight.

For example, in the step of preparing a copolymer shell, a molecular weight modifier may be used.

For example, based on 100 parts by weight in total of the graft copolymer (A), the molecular weight modifier may be used in an amount of 0.01 to 2 parts by weight, preferably 0.05 to 2 parts by weight, more preferably 0.05 to 1 part by weight. Within this range, a polymer having a desired molecular weight may be easily prepared.

For example, the molecular weight modifier may include one or more selected from the group consisting of xx-methyl styrene dimer, t-dodecyl mercaptan, n-dodecyl mercaptan, octyl mercaptan, carbon tetrachloride, methylene chloride, methylene bromide, tetra ethyl thiuram disulfide, dipentamethylene thiuram disulfide, and diisopropylxanthogen disulfide, but the present invention is not limited thereto.

In the present disclosure, 100 parts by weight of the graft copolymer may mean the total weight of the finally obtained graft copolymer; the total weight of the monomers used in the preparation of the polymer seed (when including the polymer seed), the rubber core, and the graft shell, considering that most of the added monomers are used for polymerization; or the total weight of the monomers added in the preparation of the polymer seed (when including the polymer seed) and the rubber core and the monomers added in the preparation of the graft shell.

In the present disclosure, unless otherwise defined, % means wt %.

In the step of preparing a seed and the step of preparing a core, as a method of feeding monomers, batch feed or continuous feed may be used alone, or two methods may be used in combination.

In the present disclosure, "continuous feed" means that components are not fed batchwise. For example, according to continuous feed, components may be fed for 10 minutes or more, 30 minutes or more, 1 hour or more, preferably 2 hours or more within a polymerization time range in drop by drop, little by little, step by step, or continuous flow.

For example, the graft copolymer (A) may be prepared by emulsion polymerization. In this case, chemical resistance, weather resistance, fluidity, tensile strength, and impact strength may be excellent.

Emulsion polymerization methods commonly practiced in the art to which the present invention pertains may be used in the present invention without particular limitation, and specifically, emulsion graft polymerization may be used.

When performing emulsion polymerization, polymerization temperature is not particularly limited. For example, emulsion polymerization may be performed at a polymerization temperature of 50 to 85° C., preferably 60 to 80° C.

For example, the latex of the graft copolymer (A) may be prepared in the form of powder through a conventional process including coagulation, washing, and drying. As a specific example, a metal salt or an acid is added, coagulation is performed at 60 to 100° C., and aging, dehydration, washing, and drying are performed to prepare the latex of the copolymer (A) in powder form, but the present invention is not limited thereto.

For example, as the graft copolymer (A), a commercially available product may be used as long as the product follows the definition of the present invention.

(B) Matrix Resin

For example, based on 100% by weight in total of the graft copolymer (A) and the matrix resin (B), the matrix resin (B) may be included in an amount of 35 to 80% by weight or 40 to 80% by weight, preferably 40 to 75% by weight, more preferably 42 to 70% by weight, still more preferably 45 to 65% by weight. In this case, by including a certain amount of a recycled resin, eco-friendliness may be obtained, and molding processability, impact strength, tensile strength, and heat resistance may be excellent.

For example, based on 100% by weight in total of the graft copolymer (A) and the matrix resin (B), the matrix resin (B) may be included in an amount of 48 to 60% by weight, preferably 45 to 60% by weight, more preferably 50 to 60% by weight. In this case, eco-friendliness, molding processability, tensile strength, and heat resistance may be excellent.

For example, based on 100% by weight in total of the graft copolymer (A) and the matrix resin (B), the matrix resin (B) may be included in an amount of 40 to 55% by weight, preferably 40 to 52% by weight, more preferably 40 to 50% by weight. In this case, impact strength and colorability may be excellent.

The recycled polystyrene is a resin obtained by recycling polystyrene (PS), which is an aromatic vinyl compound-derived polymer.

For example, the recycled polystyrene may be a recycled resin derived from a general-purpose polystyrene (GPPS) resin and/or a high-impact polystyrene (HIPS) resin. In this case, even when a recycled resin is used instead of a conventional virgin polystyrene, physical properties equal or superior to those of the virgin polystyrene may be provided.

For example, the general-purpose polystyrene resin may be an aromatic vinyl compound, preferably a homopolymer of styrene.

For example, the high-impact polystyrene resin may be a rubber-reinforced polystyrene resin containing rubber having an average particle diameter of 0.1 to 20 μm. For example, the rubber included in the high-impact polystyrene resin may include one or more selected from the group consisting of butadiene-based rubber, isoprene-based rubber, a copolymer of butadiene and styrene, and alkylacrylate rubber.

For example, based on 100% by weight in total of the matrix resin (B), the matrix resin (B) may include 50 to 90% by weight of recycled polystyrene and 8 to 50% by weight of a polyarylene oxide, preferably 50 to 85% by weight of recycled polystyrene and 9 to 50% by weight of a polyarylene oxide, 50 to 80% by weight of recycled polystyrene and 10 to 48% by weight of a polyarylene oxide, or 50 to 70% by weight of recycled polystyrene and 12 to 47% by weight of a polyarylene oxide. Within this range, molding processability, impact strength, tensile strength, and heat resistance may be excellent.

For example, based on 100% by weight in total of the matrix resin (B), the matrix resin (B) may include 50 to 68% by weight of recycled polystyrene and 25 to 50% by weight of a polyarylene oxide, preferably 50 to 67% by weight of recycled polystyrene and 30 to 50% by weight of a polyarylene oxide, or 50 to 65% by weight of recycled polystyrene and 35 to 50% by weight of a polyarylene oxide. Within this range, impact strength, tensile strength, heat resistance, and colorability may be excellent without deterioration of other physical properties.

As a specific example, the matrix resin (B) may include 50 to 90% by weight of recycled polystyrene and 10 to 50% by weight of a polyarylene oxide, preferably 50 to 85% by weight of recycled polystyrene and 15 to 50% by weight of a polyarylene oxide, more preferably 52 to 80% by weight of recycled polystyrene and 20 to 48% by weight of a polyarylene oxide, still more preferably 53 to 70% by weight of recycled polystyrene and 30 to 47% by weight of a polyarylene oxide. Within this range, by including a certain amount of a recycled resin, eco-friendliness may be obtained, and molding processability, impact strength, tensile strength, heat resistance, and colorability may be excellent.

In the present disclosure, a resin not referred to as a recycled or virgin resin may mean either a recycled or virgin resin, but preferably a virgin resin.

For example, the matrix resin (B) may include virgin general-purpose polystyrene. In this case, molding processability, impact strength, tensile strength, and heat resistance may be excellent.

For example, based on a total weight of the matrix resin (B), the matrix resin (B) may include 50 to 90% by weight of recycled polystyrene, 8 to 45% by weight of a polyarylene oxide, and 0 to 30% by weight of virgin general-purpose polystyrene, as a specific example, 50 to 90% by weight of recycled polystyrene, 8 to 45% by weight of a polyarylene oxide, and 1 to 30% by weight of virgin general-purpose polystyrene, preferably 50 to 85% by weight of recycled polystyrene, 10 to 45% by weight of a polyarylene oxide, and 2 to 28% by weight of virgin general-purpose polystyrene, more preferably 50 to 75% by weight of recycled polystyrene, 13 to 42% by weight of a polyarylene oxide, and 3 to 27% by weight of virgin general-purpose polystyrene, still more preferably 50 to 70% by weight of recycled polystyrene, 15 to 40% by weight of a polyarylene oxide, and 3 to 27% by weight of virgin general-purpose polystyrene, still more preferably 50 to 65% by weight of recycled polystyrene, 15 to 40% by weight of a polyarylene oxide, and 5 to 25% by weight of virgin general-purpose polystyrene. Within this range, molding processability and physical property balance may be excellent.

For example, the matrix resin (B) may further include an aromatic vinyl compound-vinyl cyanide compound copolymer (hereinafter referred to as "SAN-based resin") including 70 to 95% by weight of an aromatic vinyl compound and 5 to 30% by weight of a vinyl cyanide compound. In this case, mechanical rigidity and weather resistance may be excellent.

As a specific example, based on 100% by weight in total of the matrix resin (B), the SAN-based resin may be included in an amount of 1 to 15% by weight, preferably 1 to 13% by weight, more preferably 2 to 12% by weight, still more preferably 2 to 10% by weight, still more preferably 3 to 10% by weight. In this case, mechanical rigidity and weather resistance may be excellent without deterioration of other physical properties.

The aromatic vinyl compound included in the recycled polystyrene and the aromatic vinyl compound included the virgin general-purpose polystyrene may be appropriately selected within the range of the aromatic vinyl compound described in the copolymer (A), and may preferably be styrene.

For example, the general-purpose polystyrene may be a homopolymer of styrene.

The polystyrene may be prepared using a preparation method commonly practiced in the art to which the present invention pertains, but the present invention is not limited thereto. As a specific example, the polystyrene may be prepared by subjecting an aromatic vinyl compound to solution polymerization, bulk polymerization, suspension polymerization, emulsion polymerization, or a mixture thereof. The polymerization may be performed in the presence of a thermal polymerization or polymerization initiator. For example, the polymerization initiator used in the polymerization may be a peroxide-based initiator, an azo-based initiator, or a mixture thereof. The peroxide-based initiator may preferably include one or more selected from the group consisting of benzoyl peroxide, t-butyl hydroperoxide, acetyl peroxide, and cumene hydroperoxide, and the azo-based initiator may preferably be an azobis isobutyronitrile.

For example, the recycled polystyrene may include recycled foamed polystyrene (expended polystyrene, EPS). For example, the recycled polystyrene may include recycled non-foamed polystyrene alone; recycled foamed polystyrene alone; or a mixture of recycled non-foamed polystyrene and recycled foamed polystyrene. In this case, regardless of whether the recycled polystyrene is foamed or not, the recycled polystyrene may be used to provide a recycled resin composition having desired physical properties.

As a specific example, based on 100% by weight in total of the recycled polystyrene, the recycled polystyrene may include 0 to 100% by weight of recycled non-foamed polystyrene and 0 to 100% by weight of recycled foamed polystyrene. More specifically, based on 100% by weight in total of the recycled polystyrene, the recycled polystyrene may include 30 to 80% by weight of recycled non-foamed polystyrene and 20 to 70% by weight of recycled foamed polystyrene, preferably 40 to 75% by weight of recycled non-foamed polystyrene and 25 to 60% by weight of recycled foamed polystyrene, more preferably 45 to 75% by weight of recycled non-foamed polystyrene and 25 to 55% by weight of recycled foamed polystyrene. Within this range, even including a recycled resin, molding processability, impact strength, tensile strength, and heat resistance may be excellent.

The foamed polystyrene is chemically or physically foamed and contains air inside, so the foamed polystyrene provides thermal insulation and cushioning action, and is mainly used as thermal insulation/cushioning packaging materials and insulation materials for buildings.

Foamed polystyrene commonly used in the art to which the present invention pertains may be used in the present invention without particular limitation. As a specific example, when a foaming agent is included in polystyrene, based on a total weight of the foamed polystyrene, the foamed polystyrene may include 0.2 to 10% by weight of a foaming agent.

Preparation methods commonly practiced in the art to which the present invention pertains may be used to prepare the foamed polystyrene without particular limitation. As a specific example, the foamed polystyrene may be prepared by foaming the melted product of a polymer and a foaming agent constituting the foamed polystyrene.

For example, when the foamed polystyrene is included, a separate volume reduction process may be performed to reduce the expanded volume of the foamed polystyrene, or a commercially available small-volume product may be used. In this case, preparation efficiency may be excellent.

For example, the recycled polystyrene may have a weight average molecular weight of 100,000 to 400,000 g/mol, preferably 110,000 to 350,000 g/mol, more preferably 130,000 to 300,000 g/mol, still more preferably 150,000 to 280,000 g/mol. Within this range, physical property balance and impact resistance may be excellent.

For example, the recycled polystyrene may have a glass transition temperature of 80 to 180° C., preferably 85 to 170° C., more preferably 90 to 160° C. Within this range, mechanical properties and molding processability may be excellent.

In the present disclosure, for example, glass transition temperature (Tg) may be measured at a heating rate of 10° C./min using a differential scanning calorimeter (Q100 DSC, TA Instruments Co.) according to ASTM D 3418.

For example, the recycled polystyrene may have a melt flow index of 20 to 60 g/10 min, preferably 30 to 55 g/10 min, more preferably 40 to 50 g/10 min as measured at 220° C. under a load of 10 kg according to ASTM D1238. Within this range, molding processability and physical property balance may be excellent.

For example, as the recycled polystyrene, a commercially available product may be used as long as the product follows the definition of the present invention.

The weight average weight, glass molecular transition temperature, and melt flow index of the general-purpose polystyrene may be appropriately selected within the same range as the recycled polystyrene.

The polyarylene oxide may be a recycled or virgin polyarylene oxide, preferably a virgin polyarylene oxide. For example, the polyarylene oxide may be a homopolymer or copolymer of aromatic arylene oxide units, preferably polyphenylene oxide (PPO).

As a specific example, the homopolymer of aromatic arylene oxide units may include one or more selected from the group consisting of poly(2,6-dimethyl-1,4-phenylene oxide), poly(2,6-diethyl-1,4-phenylene oxide), poly(2,6-dipropyl-1,4-phenylene)oxide, poly(2-methyl-6-ethyl-1,4-phenylene)oxide, poly(2-methyl-6-propyl-1,4-phenylene oxide), poly(2-ethyl-6-propyl-1,4-phenylene)oxide, poly(2,5-dimethyl-1,4-phenylene oxide), poly(2,3,6-trimethyl-1,4-phenylene)oxide, poly(2,3,6-triethyl-1,4-phenylene)oxide, poly(2,6-dimethoxy-1,4-phenylene oxide), poly(2,6-dichloromethyl-1,4-phenylene oxide), poly(2,6-dibromomethyl-1,4-phenylene oxide), and poly(2,6-diphenyl-1,4-phenylene) oxide, preferably poly(2,6-dimethyl-1,4-phenylene oxide).

The copolymer of aromatic arylene oxide units means a polymer obtained by copolymerizing an aromatic arylene oxide unit as a main monomer and a comonomer. As a specific example, the copolymer of aromatic arylene oxide units may be selected from the group consisting of a copolymer of poly(2,6-dimethyl-1,4-phenylene)oxide and poly(2,3,6-trimethyl-1,4-phenylene)oxide; a copolymer of poly(2,6-dimethyl-1,4-phenylene)oxide and poly(2,3,6-triethyl-1,4-phenylene)oxide; and a combination thereof. As a preferred example, the copolymer of aromatic arylene oxide units may be a copolymer of poly(2,6-dimethyl-1,4-phenylene)oxide and poly(2,3,6-trimethyl-1,4-phenylene)oxide.

For example, the polyarylene oxide may have a number average molecular weight of 10,000 to 100,000 g/mol, preferably 10,000 to 70,000 g/mol, more preferably 15,000 to 45,000 g/mol. Within this range, processability and physical property balance may be excellent.

In the present disclosure, the number average molecular weight may be measured in the same way as the weight average molecular weight, and may be calculated as a number average value.

For example, the polyarylene oxide may have an intrinsic viscosity of 0.15 to 0.6 dl/g, preferably 0.2 to 0.5 dl/g, more preferably 0.2 to 0.4 dl/g, still more preferably 0.25 to 0.4 dl/g. Within this range, the physical property balance between the mechanical strength and molding processability of a composition may be excellent.

In the present disclosure, when intrinsic viscosity is measured, unless noted otherwise, a sample to be measured is dissolved at a concentration of 0.5 g/dl in chloroform. Then, the intrinsic viscosity of the sample is measured at 25° C. using a Ubbelohde viscometer.

For example, preparation methods commonly used in the art to which the present invention pertains may be used to prepare the polyarylene oxide. Also, a commercially available product may be used as long as the product follows the definition of the present invention.

The SAN-based resin may be a recycled or virgin SAN-based resin, preferably a virgin SAN-based resin. For example, the SAN-based resin may include 70 to 95% by weight of an aromatic vinyl compound and 5 to 30% by weight of a vinyl cyanide compound, preferably 70 to 90% by weight of an aromatic vinyl compound and 10 to 30% by weight of a vinyl cyanide compound, more preferably 80 to 90% by weight of an aromatic vinyl compound and 10 to 20% by weight of a vinyl cyanide compound. In this case, fluidity and impact strength may be excellent without deterioration of other physical properties.

The aromatic vinyl compound and vinyl cyanide compound included in the SAN-based resin may be appropriately selected within the range of the aromatic vinyl compound and vinyl cyanide compound of the graft copolymer (A) described above.

For example, the SAN-based resin may have a weight average molecular weight of 70,000 to 200,000 g/mol, preferably 80,000 to 180,000 g/mol, more preferably 90,000 to 160,000 g/mol. Within this range, mechanical strength and weather resistance may be excellent.

For example, preparation methods commonly used in the art to which the present invention pertains may be used to prepare the SAN-based resin. Also, a commercially available product may be used as long as the product follows the definition of the present invention.

(C) Alkyl Acrylate-Aromatic Vinyl Compound-Vinyl Cyanide Compound Graft Copolymer Containing Rubber Core Having Average Particle Diameter of Greater than 200 nm and 500 nm or Less For example, the thermoplastic resin composition may include an alkyl acrylate-aromatic vinyl compound-vinyl cyanide compound graft copolymer (hereinafter referred to as "graft copolymer (C)") including an alkyl acrylate rubber core having an average particle diameter of greater than 200 nm and 500 nm or less and including an alkyl acrylate compound; and an aromatic vinyl compound-vinyl cyanide compound copolymer shell formed to surround the core and including an aromatic vinyl compound and a vinyl cyanide compound. In this case, molding processability, impact strength, tensile strength, and heat resistance may be excellent.

For example, based on 100 parts by weight in total of the graft copolymer (A) and the recycled polystyrene (B), the graft copolymer (C) may be included in an amount of 0 to 12 parts by weight, as a specific example, 0.1 to 12 parts by weight, preferably 0.5 to 10 parts by weight, more preferably 1 to 10 parts by weight, still more preferably 2 to 8 parts by weight. Within this range, fluidity and gloss may be excellent without deterioration of other physical properties.

For example, the alkyl acrylate rubber core included in the graft copolymer (C) may have an average particle diameter of greater than 200 nm and 500 nm or less, preferably 205 to 500 nm, more preferably 210 to 490 nm, still more preferably 250 to 450 nm, still more preferably 300 to 430 nm. In this case, molding processability, impact strength, tensile strength, and heat resistance may be excellent.

For example, based on a total weight of the graft copolymer (C), the graft copolymer (C) may include 30 to 70% by weight of the alkyl acrylate rubber core and 30 to 70% by weight of the aromatic vinyl compound-vinyl cyanide compound copolymer shell, preferably 35 to 65% by weight of the alkyl acrylate rubber core and 35 to 65% by weight of the aromatic compound-vinyl cyanide compound copolymer shell, more preferably 40 to 60% by weight of the alkyl acrylate rubber core and 40 to 60% by weight of the aromatic vinyl compound-vinyl cyanide compound copolymer shell. In this case, molding processability, impact strength, tensile strength, and heat resistance may be excellent.

For example, the aromatic vinyl compound-vinyl cyanide compound copolymer shell included in the graft copolymer (C) may include 50 to 99% by weight of an aromatic vinyl compound and 1 to 50% by weight of a vinyl cyanide compound, preferably 60 to 90% by weight of an aromatic vinyl compound and 10 to 40% by weight of a vinyl cyanide compound, more preferably 65 to 80% by weight of an aromatic vinyl compound and 20 to 35% by weight of a vinyl cyanide compound. In this case, molding processability, impact strength, and gloss may be excellent.

The alkyl acrylate, aromatic vinyl compound, and vinyl cyanide compound included in the graft copolymer (C) may be appropriately selected within the range of the graft copolymer (A) described above.

For example, preparation methods commonly used in the art to which the present invention pertains may be used to prepare the graft copolymer (C). Also, a commercially available product may be used as long as the product follows the definition of the present invention.

(D) Light Stabilizer

For example, the thermoplastic resin composition may include a light stabilizer (D). As a specific example, based on 100 parts by weight in total of the graft copolymer (A) and the matrix resin (B), the light stabilizer (D) may be included in an amount of 0.1 to 7 parts by weight, preferably 0.3 to 5 parts by weight, more preferably 0.5 to 3 parts by weight, still more preferably 1 to 2 parts by weight. Within this range, weather resistance may be excellent without deterioration of other physical properties.

For example, the light stabilizer (D) may include one or more selected from the group consisting of a triazine-based compound, a benzophenone-based compound, a benzotriazole-based compound, an indole-based compound, a quinolinone-based compound, a benzoate-based compound, a cyanoacrylate-based compound, and an amine-based compound, preferably a benzotriazole-based UV absorber or an amine-based compound. In this case, physical property balance may be excellent, and light resistance may be further improved.

For example, the triazine-based UV absorber may include one or more selected from the group consisting of 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,6-diphenyl-4-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4,6-tris(2-hydroxy-4-propoxyphenyl)-1,3,5-triazine, 2,4,6-tris(2-hydroxy-4-butoxyphenyl)-1,3,5-triazine, 2,4,6-tris(2-hydroxy-4-butoxyphenyl)-1,3,5-triazine, 2,4,6-tris(2-hydroxy-4-hexyloxyphenyl)-1,3,5-triazine, 2,4,6-tris(2-hydroxy-4-octyloxyphenyl)-1,3,5-triazine, 2,4,6-tris(2-hydroxy-4-dodecyloxyphenyl)-1,3,5-triazine, 2,4,6-tris(2-hydroxy-4-benzyloxyphenyl)-1,3,5-triazine, 2,4,6-tris(2-hydroxy-4-ethoxyethoxyphenyl)-1,3,5-triazine, 2,4,6-tris(2-hydroxy-4-butoxyethoxyphenyl)-1,3,5-triazine, 2,4,6-tris(2-hydroxy-4-propoxyethoxyphenyl)-1,3,5-triazine, 2,4,6-tris(2-hydroxy-4-methoxycarbonylpropyloxyphenyl)-1,3,5-triazine, 2,4,6-tris(2-hydroxy-4-ethoxycarbonylethyloxyphenyl)-1,3,5-triazine, 2,4,6-tris(2-hydroxy-4-(1-(2-ethoxyhexyloxy)-1-oxopropane-2-yloxy)phenyl)-1,3,5-triazine, 2,4,6-tris(2-hydroxy-3-methyl-4-ethoxyphenyl)-1,3,5-triazine, 2,4,6-tris(2-hydroxy-3-methyl-4-propoxyphenyl)-1,3,5-triazine, 2,4,6-tris(2-hydroxy-3-methyl-4-butoxyphenyl)-1,3,5-triazine, 2,4,6-tris(2-hydroxy-3-methyl-4-butoxyphenyl)-1,3,5-triazine, 2,4,6-tris(2-hydroxy-3-methyl-4-hexyloxyphenyl)-1,3,5-triazine, 2,4,6-tris(2-hydroxy-3-methyl-4-octyloxyphenyl)-1,3,5-triazine, 2,4,6-tris(2-hydroxy-3-methyl-4-dodecyloxyphenyl)-1,3,5-triazine, 2,4,6-tris(2-hydroxy-3-methyl-4-benzyloxyphenyl)-1,3,5-triazine, 2,4,6-tris(2-hydroxy-3-methyl-4-ethoxyethoxyphenyl)-1,3,5-triazine, 2,4,6-tris(2-hydroxy-3-methyl-4-butoxyethoxyphenyl)-1,3,5-triazine, 2,4,6-tris(2-hydroxy-3-methyl-4-propoxyethoxyphenyl)-1,3,5-triazine, 2,4,6-tris(2-hydroxy-3-methyl-4-methoxycarbonylpropyloxyphenyl)-1,3,5-triazine, 2,4,6-tris(2-hydroxy-3-methyl-4-ethoxycarbonylethyloxyphenyl)-1,3,5-triazine, 2,4,6-tris(2-hydroxy-3-methyl-4-(1-(2-ethoxyhexyloxy)-1-oxopropane-2-yloxy)phenyl)-1,3,5-triazine, 2,4-bis(2,4-dimethylphenyl)-6-(2-hydroxy-4-N-octyloxyphenyl)-1,3,5-triazine, and 2-(4,6-diphenyl-1,3,5-triazine-2-yl)-5-(2-(2-ethylhexanoyloxy) ethoxy) phenol.

For example, the benzophenone-based UV absorber may include one or more selected from the group consisting of 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydrideratebenzophenone, 2-hydroxy-4-dodecyloxy-benzophenone, 2-hydroxy-4-octadecyloxy-benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl) methane, 2-hydroxy-4-n-dodecyloxybenzophenone, 2-hydroxy-4-methoxy-2 '-carboxybenzophenone, and 4, 4'-bis(diethylamino)benzophenone.

For example, the benzotriazole-based UV absorber may include one or more selected from the group consisting of 2-(2'-hydroxy-5'-methylphenyl)benzotriazole, 2-2'-hydroxy-3',2-(2'-hydroxy-3'-tert-butyl-5'-methylphenyl)benzotriazole, 2-(2'-hydroxy-5'-methylphenyl)benzotriazole, 5'-bis(α,α-dimethylbenzyl)phenyl-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butyl-phenyl)-5-chlorobenzotriazole, 2-(2'-hydroxy-3',5'-di-tert-amyl)-benzotriazole, 2-(2'-hydroxy-3',5'-di-tert-amylphenyl)-5-chlorobenzotriazole, 2-(2'-hydroxy-3'-(3',4',5',6'-tetrahydrophthalimidemethyl)-5'-methylphenyl)benzotriazole, 2-(2-hydroxy-3,5-di-tert-pentylphenyl), 2-(2'-hydroxy-5'-tert-octylphenyl)benzotriazole, 2,2'-methylenebis [4-(1,1,3,3-tetramethylbutyl)-6-(2H-benzotriazole-2-yl) phenol], and 2-[5-chloro(2H)-benzotriazole-2-yl]-4-methyl-6-(tert-butyl) phenol, preferably 2-[5-chloro(2H)-benzotriazole-2-yl]-4-methyl-6-(tert-butyl) phenol.

For example, the indole-based UV absorber may be 2-[(1-methyl-2-phenyl-1H-indole-3-yl)methylene]propanedinitrile.

For example, the quinolinone-based UV absorber may be 4-hydroxy-3-[(phenylimino)methyl]-2 (1H)-quinolinone.

For example, the benzoate-based UV absorber may include one or more selected from the group consisting of 2,4-di-t-butylphenyl-3',5'-di-t-butyl-4'-hydroxybenzoate, 2,6-di-t-butylphenyl-3',5'-di-t-butyl-4'-hydroxybenzoate, n-hexadecyl-3,5-di-t-butyl-4-hydroxybenzoate, and n-octadecyl-3,5-di-t-butyl-4-hydroxybenzoate.

For example, the cyanoacrylate-based UV absorber may be 2'-ethylhexyl-2-cyano-3,3-diphenylacrylate, ethyl-2-cyano-3-(3',4'-methylenedioxyphenyl)-acrylate, or a mixture thereof.

For example, the amine-based UV absorber may be a hindered amine-based UV stabilizer (HALS), and may preferably include one or more selected from the group consisting of 1,1-bis(2,2,6,6-tetramethyl-4-piperidyl) succinate, bis(2,2,6,6-tetramethyl-4-piperidyl) sebacate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl)-N-butyl-3,5-di-tert-butyl-4-hydroxybenzylmalonate, a condensation product of 1-(2-hydroxyethyl)-2,2,6,6-tetramethyl-4-hydroxypiperidine and succinic acid, a linear or cyclic condensation product of N,N'-bis(2,2,6,6-tetramethyl-4-piperidyl) hexamethylene diamine and 4-tert-octylamino-2,6-di-chloro-1,3,5-triazine, tris(2,2,6,6-tetramethyl-4-piperidyl) nitrilotriacetate, tetrakis(2,2,6,6-tetramethyl-4-piperidyl)-1,2,3,4-butane tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, a linear or cyclic condensation product of N,N'-bis(2,2,6,6-tetramethyl-4-piperidyl) hexamethylene diamine and 4-morpholino-2,6-dichloro-1,3,5-triazine, a reaction product of 7,7,9,9-tetramethyl-2-cycloundecyl-1-oxa-3,8-diaza-4-oxospiro-[4,5]decane and epichlorohydrin, and poly [[6-(1,1,3,3-tetramethylbutyl)amino]-1,3,5-triazine-2,4-diyl][(2,2,6,6-tetramethyl-4-piperidinyl)imino]-1,6-hexanediyl [(2,2,6,6-tetramethyl-4-piperidinyl)imino], more preferably bis(2,2,6,6-tetramethyl-4-piperidinyl) sebacate.

Thermoplastic Resin Composition

The thermoplastic resin composition may include the graft copolymer (A) and the matrix resin (B). In this case, eco-friendliness may be obtained by including a recycled resin, and molding processability, impact strength, tensile strength, heat resistance, and colorability may be excellent.

For example, the thermoplastic resin composition may include the graft copolymer (A), the matrix resin (B), and one or more selected from the group consisting of the graft copolymer (C) and the light stabilizer (D). In this case, molding processability, impact strength, and gloss may be excellent.

For example, based on 100 parts by weight in total of the graft copolymer (A) and the matrix resin (B), the thermoplastic resin composition may include 0 to 12 parts by weight or 0.1 to 12 parts by weight of the graft copolymer (C); and 0 to 7 parts by weight or 0.1 to 7 parts by weight of the light stabilizer (D). In this case, eco-friendliness may be obtained by including a recycled resin, and molding processability, impact strength, tensile strength, heat resistance, and colorability may be excellent.

For example, the thermoplastic resin composition may have a heat deflection temperature (HDT) of 82° C. or higher, preferably 82 to 120 preferably 82 to 115° C., still more preferably 83 to 110° C., as a specific example, 87 to 110° C. or 88 to 105° C. as measured under a load of 18.5 kgf according to ASTM D 648. Within this range, heat resistance may be excellent without deterioration of other physical properties.

For example, the thermoplastic resin composition may have a tensile strength of 400 kgf/cm$^2$ or more, preferably 400 to 530 kgf/cm$^2$, more preferably 400 to 520 kgf/cm$^2$, still more preferably 400 to 510 kgf/cm$^2$, as a specific example, 405 to 520 kgf/cm$^2$ or 410 to 510 kgf/cm$^2$ as measured at room temperature and a rate of 50 mm/min according to ASTM D 638. Within this range, tensile strength may be excellent without deterioration of other physical properties.

For example, the thermoplastic resin composition may have a melt flow index of 6 g/10 min or more, preferably 6 to 30 g/10 min, more preferably 6 to 25 g/10 min, still more preferably 6 to 22 g/10 min as measured at a temperature of 230° C. under a load of 10 kg according to ASTM D1238. Within this range, molding processability may be excellent without deterioration of other physical properties.

For example, the thermoplastic resin composition may have an impact strength of 10 kgf·cm/cm or more, preferably 10 to 30 kgf·cm/cm, more preferably 10 to 25 kgf·cm/cm, still more preferably 10 to 20 kgf·cm/cm as measured at room temperature under the condition of ¼" thickness according to ASTM D1238. Within this range, impact strength may be excellent without deterioration of other physical properties.

In the present disclosure, the room temperature may be at any point in the range of 23±3° C.

For example, the thermoplastic resin composition may have a colorability C/S value of 103 or more, preferably 103 to 120, more preferably 103 to 115, still more preferably 103 to 110 as calculated using L and b values measured according to the CIE Lab method. Within this range, colorability may be excellent without deterioration of other physical properties.

In the present disclosure, as a specific measurement example, colorability may be measured at a degree observer of 10° under a UV D65 light source using X-lite Color-eye 7000A equipment according to the CIE Lab method. "L" and "b" values are obtained in a reflectance mode using a Munsell System according to the CIE Lab method. Then, based on the measured "L" and "b" values, an automatically calculated colorability C/S (color strength) value is obtained based on a formula included in the software of Propalett Paint/Plastics Formulation Platinum 5.2.5.1. (GretagMacbeth LLC Co.). Here, when the C/S value is greater than 100, colorability is considered excellent. As the C/S value increases, colorability increases.

For reference, in the CIE LAB color coordinate system, the "L" value is expressed as a number from 0 to 100. As the "L" value approaches 0, blackness increases. As the "L" value approaches 100, whiteness increases. The "a" value represents a red-green value, and the "b" value represents a yellow-blue value.

Method of Preparing Thermoplastic Resin Composition

A method of preparing the thermoplastic resin composition of the present invention includes a step of kneading and extruding an alkyl acrylate-aromatic vinyl compound-vinyl cyanide compound graft copolymer (A) containing an alkyl acrylate rubber core having an average particle diameter of 60 to 200 nm and an aromatic vinyl compound-vinyl cyanide compound copolymer shell; and a matrix resin (B) at 180 to 300° C. and 100 to 400 rpm, wherein, based on a total weight of the copolymer shell of the graft copolymer (A), the copolymer shell includes 85 to 99% by weight of an aromatic vinyl compound and 1 to 15% by weight of a vinyl cyanide compound and has a weight average molecular weight of 100,000 to 400,000 g/mol, and the matrix resin (B) includes 50 to 90% by weight of recycled polystyrene and 8 to 50% by weight of a polyarylene oxide based on 100% by weight in total of the matrix resin (B). In this case, eco-friendliness may be obtained by including a recycled resin, and molding processability, impact strength, tensile strength, heat resistance, and colorability may be excellent.

For example, in the kneading and extrusion step, the graft copolymer (A), the matrix resin (B), and one or more selected from the group consisting of a graft copolymer (C) and a light stabilizer (D) may be kneaded and extruded. In this case, molding processability, impact strength, tensile strength, heat resistance, and colorability may be excellent.

For example, the kneading and extrusion step may be performed using one or more selected from the group consisting of a single-screw extruder, a twin-screw extruder, and a Banbury mixer. For example, the components may be uniformly mixed and extruded to obtain a thermoplastic resin composition in the form of pellets. In this case, deterioration of mechanical properties and heat resistance may be prevented, and appearance may be excellent.

For example, in the kneading and extrusion step, the cylinder temperature of the extruder may be 180 to 300° C., preferably 210 to 290° C., more preferably 220 to 280° C. In this case, throughput per unit time may be appropriate, and may melt-kneading be performed sufficiently. In addition, thermal decomposition may be prevented, thereby preventing deterioration of physical properties.

For example, the kneading and extrusion may be performed at a screw rotation rate of 100 to 400 rpm, preferably 110 to 350 rpm, more preferably 120 to 270 rpm. In this case, due to appropriate throughput per unit time, process efficiency may be excellent.

When necessary, based on 100 parts by weight in total of the graft copolymer (A) and the matrix resin (B), the thermoplastic resin composition may further include one or more additives selected from the group consisting of a lubricant, a heat stabilizer, a pigment, a release agent, an antistatic agent, an antibacterial agent, a processing aid, a smoke suppressant, an anti-drip agent, an anti-friction agent, and an anti-wear agent in an amount of 0.01 to 10 parts by weight, 0.05 to 7 parts by weight, 0.1 to 5 parts by weight, 0.3 to 4.5 parts by weight, or 0.3 to 4 parts by weight. Within this range, the desired physical properties may be efficiently expressed without deterioration of the physical properties of the thermoplastic resin composition of the present invention.

For example, the lubricant may include one or more selected from the group consisting of a fatty acid amide-based compound, montan-based wax, silicone oil, and olefin-based wax, preferably olefin-based wax, more preferably polyethylene wax. In this case, molding processability and mold releasability may be excellent, and friction noise resistance may be further improved.

For example, the fatty acid amide-based compound may include one or more selected from the group consisting of stearamide, behenamide, ethylenebis(stearamide), N,N'-ethylenebis(12-hydroxystearamide), erucamide, oleamide, and ethylenebis(oleamide).

For example, the montan-based wax may be montan wax, montan ester wax, or a mixture thereof.

For example, the silicone oil may include one or more selected from the group consisting of dimethyl silicone oil, methyl hydrogen silicone oil, ester-modified silicone oil, hydroxy silicone oil, carbinol-modified silicone oil, vinyl silicone oil, and silicone acrylate.

For example, the olefin-based wax may be oxidized polyethylene wax, polyethylene wax, polypropylene wax, or a mixture thereof.

For example, the heat stabilizer may be a phenol-based heat stabilizer, a phosphorus-based heat stabilizer, or a mixture thereof, preferably a phenol-based heat stabilizer. In this case, oxidation by heat may be prevented during the extrusion process, and mechanical properties and heat resistance may be excellent.

For example, the phenol-based heat stabilizer may include one or more selected from the group consisting of N,N'-hexane-1,6-diyl-bis [3-(3,5-di-t-butyl-4-hydroxyphenyl propionamide)], pentaerythritol tetrakis [3-(3,5-di-t-butyl-4-hydroxyphenyl) propionate], N,N'-hexamethylene-bis(3,5-di-t-butyl-4-hydroxy-hydrocinnamamide), triethyleneglycol-bis [3-(3-t-butyl-5-methyl-4-hydroxyphenyl) propionate], 3,5-di-t-butyl-4-hydroxybenzylphosphonate-diethylester, 1,3,5-trimethyl-2,4,6-tris(3,5-di-t-butyl-4-hydroxybenzyl) benzene, and 1,3,5-tris(4-t-butyl-3-hydroxy-2,6-dimethylbenzyl) isocyanurate. In this case, physical property balance may be excellent, and heat resistance may be greatly improved.

For example, the phosphorus-based heat stabilizer may include one or more selected from the group consisting of triphenylphosphite, tris(nonylphenyl) phosphite, tris(2,4-di-tert-butylphenyl) phosphite, tris(2,6-di-tert-butylphenyl) phosphite, tridecylphosphite, trioctylphosphite, trioctadecylphosphite, didecylmonophenylphosphite, dioctylmonophenylphosphite, diisopropylmonophenylphosphite, monobutyldiphenylphosphite, monodecyldiphenylphosphite, monooctyldiphenylphosphite, bis(2,6-di-tert-butyl-4-methylphenyl) pentaerythritoldiphosphite, 2,2-methylenebis (4,6-di-tert-butylphenyl) octylphosphite, bis(nonylphenyl) pentaerythritoldiphosphite, bis(2,4-di-tert-butylphenyl) pentaerythritoldiphosphite, stearylpentaerythritoldiphosphite, tributylphosphate, triethylphosphate, and trimethylphosphate.

The pigment may be an inorganic pigment or an organic pigment.

For example, the organic pigment may include one or more selected from the group consisting of a perinone-based pigment, an anthraquinone-based pigment, a perylene-based pigment, a phthalocyanine-based pigment, an azo-based pigment, an indigo-based pigment, a dioxazine-based pigment, a quinacridone-based pigment, a methane-based pigment, a quinoline-based pigment, an isoindrinone-based pigment, and a phthalone-based pigment.

For example, the inorganic pigment may include one or more selected from the group consisting of an ultramarine-based pigment, titanium dioxide, zinc sulfide, tetracyclic zinc, iron oxide, and carbon black.

For example, as the release agent, one or more selected from glycerin stearate and polyethylene tetrastearate may be used, without being limited thereto.

For example, as the antistatic agent, one or more selected from anionic surfactants and nonionic surfactants may be used, without being limited thereto.

For example, the anti-drip agent may include one or more selected from the group consisting of polytetrafluoroethylene (PTFE), a mixture (PTFE/SAN) of PTFE and a styrene-acrylonitrile (SAN) resin, a mixture (PTFE/PMMA) of PTFE and poly(methyl methacrylate) (PMMA), polyamide, polysilicon, and a tetrafluoroethylene-hexafluoropropylene (TFE-HFP) copolymer, preferably one or more selected from the group consisting of PTFE/SAN and PTFE/PMMA, more preferably PTFE/SAN. In the PTFE/SAN and PTFE/PMMA, the weight ratio of PTFE to SAN or PMMA may preferably be 1:0.5 to 1.5, as a specific example, 1:1.

Antibacterial agents, processing aids, smoke suppressants, anti-friction agents, and anti-wear agents commonly used in the art to which the present invention pertains may be used in the present invention without particular limitation.

Molded Article

A molded article of the present invention includes the thermoplastic resin composition of the present invention. In this case, eco-friendliness may be obtained by including a recycled resin, and molding processability, impact strength, tensile strength, and heat resistance may be excellent.

Even though the molded article includes a recycled resin, physical properties equal or superior to those of a conventional thermoplastic resin based on a virgin resin may be secured. Thus, the molded article may be used without further processing in various fields using conventional ASA-based thermoplastic resin compositions based on a virgin resin, such as building interior and exterior materials, automobile interior and exterior materials, ships, and leisure and sports goods.

As a preferred example, the molded article has a heat deflection temperature (HDT) of 82° C. or higher as measured under a load of 18.5 kgf according to ASTM D 648, has a melt flow index of 6 g/10 min or more as measured at a temperature of 230° C. under a load of 10 kg according to ASTM D1238, has an impact strength of 10 kgf·cm/cm or more as measured at room temperature under the condition of ¼" thickness according to ASTM D256, has a tensile strength of 400 kgf/cm$^2$ or more as measured at room temperature and a rate of 50 mm/min according to ASTM D638, and has a colorability of 103 or higher as measured according to the above-described conditions. Thus, due to these excellent properties, the molded article may be used in fields requiring excellent molding processability, impact strength, tensile strength, heat resistance, and colorability.

Manufacturing methods commonly used in the art to which the present invention pertains may be used to manufacture the molded article. For example, the molded article may be manufactured using the melt-kneaded product or pellets of the thermoplastic resin composition according to the present invention as a raw material using an injection molding method, an injection compression molding method, an extrusion molding method, a blow molding method, a press molding method, a pressure molding method, a heat bending molding method, a compression molding method, a calender molding method, or a rotational molding method. At this time, the size, thickness, and shape of the molded article may be appropriately adjusted according to the purpose of use.

Preferably, the molded article may be manufactured using a method including a step of injecting the melt-kneaded product or pellets of the thermoplastic resin composition of the present invention at a barrel temperature of 180 to 300° C. using an injection machine. The manufactured molded article may be used in fields requiring excellent gloss, molding processability, and impact strength.

In describing the thermoplastic resin composition of the present invention, the method of preparing the same, and the molded article including the same, it should be noted that other conditions or equipment not explicitly described herein may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes s and modifications may be made without departing from the spirit and scope of the present invention, and such changes and modifications are also within the scope of the appended claims.

EXAMPLES

Materials used in the following examples and comparative examples are as follows.

(A) ASA graft copolymer: An ASA graft copolymer including a butyl acrylate seed polymer; a butyl acrylate rubber core; and a styrene-acrylonitrile copolymer shell is used. The average particle diameters of the seed and core and the composition and weight average molecular weight of the shell satisfy the conditions shown in Table 1 below (Based on a total weight of the ASA graft copolymer (A), 7% by weight of the seed polymer, 43% by weight of the rubber core, and 50% by weight of the copolymer shell are included).

TABLE 1

| | (A) ASA graft copolymer | | |
|---|---|---|---|
| | Core | Shell | |
| | Average particle diameter (nm) | AN content (wt %) | Mw (g/mol) |
| A-1 | 100 | 2 | 212,000 |
| A-2 | 100 | 5 | 224,000 |
| A-3 | 100 | 10 | 241,000 |
| A-4 | 100 | 15 | 253,000 |
| A-5 | 100 | 5 | 110,000 |
| A-6 | 100 | 5 | 395,000 |
| A-7 | 150 | 5 | 226,000 |
| A-8 | 400 | 5 | 221,000 |
| A-9 | 100 | 0 | 225,000 |
| A-10 | 100 | 17 | 226,000 |
| A-11 | 100 | 5 | 85,000 |
| A-12 | 100 | 5 | 450,000 |

(In Table 1, in the case of A-9, a vinyl cyanide compound is not included, but for convenience of comparison, A-9 is classified as the ASA graft copolymer (A), AN represents acrylonitrile, MW represents weight average molecular weight, and the AN content of a shell means wt % of AN based on a total weight of the shell.)

(B) Matrix resins:

(B-1) Recycled PS resin (non-foamed PS) (Mw: 240,000 g/mol)

(B-2) Recycled EPS resin (Mw: 165,000 g/mol)

(B-3) Virgin GPPS (25SPI, MW: 275,000 g/mol, LG Chemical Co.)

(B-4) PPO: Poly(2,6-dimethyl-1,4-phenylene)oxide (LXR035, Bluestar Co.) having an intrinsic viscosity of 0.32 dl/g and a melt flow index of 28 g/10 min as measured at 220° C. under a load of 10 kg according to ASTM D1238

(B-5) SAN resin (82TR SAN, LG Chemical Co.)

(C) Large-diameter ASA resin (SA927, LG Chemical Co.) containing a butylacrylate rubber core having an average particle diameter of 380 to 500 nm

Examples 1 to 13 and Comparative Examples 1 to 10

According to the contents shown in Table 2, (A) to (C) were mixed using a super mixer, and then extruded at a cylinder temperature of 260° C. and a screw rotation rate of 200 rpm using a twin-screw extruder (screw diameter: 26 mm, L/D=40) to obtain pellets.

The obtained thermoplastic resin composition in the form of pellets was dried at 80° C. for 2 hours or more, and then injection-molded at a barrel temperature of 230° C., a mold temperature of 60° C., and an injection speed of 30 mm/see using an injection machine to obtain a specimen for measuring physical properties. Then, after leaving the specimen at room temperature for more than 48 hours, the physical properties thereof were measured.

TEST EXAMPLES

The physical properties of the specimens prepared in examples and comparative examples were measured in the following methods, and the results are shown in Table 3 below.

Melt flow index (g/10 min): A load of 10 kg was applied at a temperature of 220° C. for 10 minutes according to ASTM D1238 to melt a resin. At this time, the weight (g) of the melted resin flowing out was measured.

Izod impact strength (kgf·cm/cm): Izod impact strength was measured at room temperature using an injection specimen having a thickness of ¼" according to ASTM D256.

Tensile strength (kgf/cm$^2$): Tensile strength was measured at a rate of 50 mm/min and room temperature using an injection specimen having a thickness of ⅛" according to ASTM D 638.

Heat deflection temperature (° C.): Heat deflection temperature (HDT) was measured under a load of 18.5 kgf according to ASTM D648.

Colorability (C/S): Colorability was measured at a degree observer of 10° under a UV D65 light source using X-lite Color-eye 7000A equipment according to the CIE Lab method. "L" and "b" values were obtained in a reflectance mode using a Munsell System according to the CIE Lab method. Then, based on the measured "L" and "b" values, a colorability C/S (color strength) value was calculated based on a formula included in the software of Propalett Paint/Plastics Formulation Platinum 5.2.5.1. (GretagMacbeth LLC Co.). Here, the C/S value is based on 100. When the C/S value is greater than 100, colorability is considered excellent.

TABLE 2

| Classification | | Composition ratio of thermoplastic resin composition | | | | | | | |
|---|---|---|---|---|---|---|---|---|---|
| | | Dry Powder (DP) | | | Matrix resin | | | | |
| | | (A) ASA | | | (B-1) Recycled | (B-2) Recycled | (B-3) | (B-4) | (B-5) |
| (wt %) | | Type | Content | (C) ASA | PS | EPS | GPPS | PPO | SAN |
| Examples | 1 | A-1 | 50 | — | 30 | — | — | 20 | — |
| | 2 | A-2 | 50 | — | 30 | — | — | 20 | — |
| | 3 | A-3 | 50 | — | 30 | — | — | 20 | — |

TABLE 2-continued

| Classification (wt %) | | Composition ratio of thermoplastic resin composition: Dry Powder (DP) (A) ASA Type | Content | (C) ASA | Matrix resin: (B-1) Recycled PS | (B-2) Recycled EPS | (B-3) GPPS | (B-4) PPO | (B-5) SAN |
|---|---|---|---|---|---|---|---|---|---|
| | 4 | A-4 | 50 | — | 30 | — | — | 20 | — |
| | 5 | A-5 | 50 | — | 30 | — | — | 20 | — |
| | 6 | A-6 | 50 | — | 30 | — | — | 20 | — |
| | 7 | A-7 | 50 | — | 30 | — | — | 20 | — |
| | 8 | A-2 | 50 | — | 30 | — | 10 | 10 | — |
| | 9 | A-2 | 40 | 5 | 30 | — | 5 | 20 | — |
| | 10 | A-2 | 50 | — | 25 | — | — | 20 | 5 |
| | 11 | A-2 | 50 | — | 20 | 10 | — | 20 | — |
| | 12 | A-2 | 40 | — | 30 | — | 10 | 20 | — |
| | 13 | A-2 | 60 | — | 10 | 10 | — | 20 | — |
| Comparative Examples | 1 | A-8 | 50 | — | 30 | — | — | 20 | — |
| | 2 | A-9 | 50 | — | 30 | — | — | 20 | — |
| | 3 | A-10 | 50 | — | 30 | — | — | 20 | — |
| | 4 | A-11 | 50 | — | 30 | — | — | 20 | — |
| | 5 | A-12 | 50 | — | 30 | — | — | 20 | — |
| | 6 | A-2 | 50 | — | 30 | — | 20 | — | — |
| | 7 | A-2 | 50 | — | 15 | — | — | 35 | — |
| | 8 | A-2 | 50 | — | 48 | — | — | 2 | — |
| | 9 | A-2 | 80 | — | 20 | — | — | — | — |
| | 10 | A-2 | 10 | — | 30 | — | 40 | 20 | — |

TABLE 3

| Classification | | Melt flow index (g/10 min) | Impact strength (kgf · cm/cm) | Tensile strength ($kgf/cm^2$) | Heat deflection temperature (° C.) | Color-ability (C/S) |
|---|---|---|---|---|---|---|
| Examples | 1 | 12.1 | 11.1 | 432 | 88.9 | 106.8 |
| | 2 | 11.3 | 12.0 | 440 | 90.7 | 107.1 |
| | 3 | 10.8 | 12.5 | 456 | 92.3 | 107.9 |
| | 4 | 10.3 | 12.9 | 461 | 94.0 | 108.3 |
| | 5 | 18.5 | 10.3 | 420 | 89.3 | 106.8 |
| | 6 | 7.0 | 13.1 | 452 | 91.3 | 106.1 |
| | 7 | 6.7 | 12.6 | 423 | 90.5 | 105.7 |
| | 8 | 16.7 | 10.5 | 402 | 86.2 | 107.5 |
| | 9 | 7.5 | 13.9 | 468 | 93.7 | 107.3 |
| | 10 | 10.6 | 10.9 | 460 | 91.2 | 107.8 |
| | 11 | 14.8 | 10.9 | 480 | 90.2 | 106.8 |
| | 12 | 14.0 | 10.1 | 500 | 92.3 | 105.9 |
| | 13 | 9.4 | 14.8 | 412 | 88.0 | 108.5 |
| Comparative Examples | 1 | 5.3 | 14.6 | 345 | 89.6 | 100.0 |
| | 2 | 12.3 | 7.2 | 442 | 86.4 | 103.0 |
| | 3 | 10.5 | 8.4 | 360 | 85.3 | 104.3 |
| | 4 | 13.6 | 8.5 | 358 | 84.9 | 105.3 |
| | 5 | 5.1 | 9.1 | 369 | 85.1 | 104.7 |
| | 6 | 19.8 | 5.3 | 360 | 78.1 | 105.1 |
| | 7 | 4.3 | 15.3 | 459 | 94.0 | 102.9 |
| | 8 | 20.3 | 6.0 | 370 | 79.2 | 105.3 |
| | 9 | 2.6 | 15.2 | 297.0 | 62.4 | 105.4 |
| | 10 | 25.6 | 2.5 | 612.0 | 90.6 | 103.0 |

As shown in Tables 1 to 3, in the case of Examples 1 to 13 according to the present invention, even though recycled PS was included, melt flow index, impact strength, tensile strength, heat deflection temperature, and colorability were equal or superior to those of comparative examples. It was confirmed that Examples 1 to 13 had excellent molding processability, mechanical rigidity, heat resistance, and colorability.

On the other hand, in the case of Comparative Examples 1 to 5 using ASA in which the average particle diameter of the alkyl acrylate rubber included in the graft copolymer (A), the content of acrylonitrile included in the copolymer shell, and the weight average molecular weight of the copolymer shell were outside the ranges of the present invention, melt flow index, impact strength, tensile strength, and/or colorability were poor. In the case of Comparative Example 6 in which the matrix resin included only GPPS instead of PPO, mechanical rigidity and heat resistance were very poor. Meanwhile, referring to Comparative Example 9, even when PPO was not used, the content of the recycled resin was reduced, and the content of ASA was increased, fluidity, tensile strength, and heat resistance were poor. It was confirmed that Comparative Example 9 was not suitable for replacing conventional non-recycled resin compositions.

In addition, in the case of Comparative Example 7 including an excess of PPO, even though the content (about 15% by weight) of the recycled resin was about half of the content of examples, molding processability and colorability were poor. In addition, in the case of Comparative Example 8 in which the content of PPO was less than the range of the present invention, mechanical rigidity and heat resistance were poor. Meanwhile, referring to Comparative Example 10, the proportion of recycled resin in the total weight of the composition was similar to that of examples. However, the total content of the matrix resin and the ratio of the components constituting the matrix resin were out of the ranges of the present invention, and as a result, impact strength was greatly reduced.

The invention claimed is:

1. A thermoplastic resin composition, comprising:

an alkyl acrylate-aromatic vinyl compound-vinyl cyanide compound graft copolymer (A) containing an alkyl acrylate rubber core having an average particle diameter of 60 to 200 nm and an aromatic vinyl compound-vinyl cyanide compound copolymer shell; and a matrix resin (B), wherein the copolymer shell of the graft copolymer (A) comprises 85 to 99% by weight of an aromatic vinyl compound and 1 to 15% by weight of a vinyl cyanide compound based on 100% by weight in total of the copolymer shell and has a weight average molecular weight of 100,000 to 400,000 g/mol, and the matrix resin (B) comprises 50 to 90% by weight of recycled polystyrene and 8 to 50% by weight of a polyarylene oxide based on 100% by weight in total of the matrix resin (B).

2. The thermoplastic resin composition according to claim 1, wherein, based on 100% by weight in total of the graft copolymer (A) and the matrix resin (B), the thermoplastic resin composition comprises 20 to 60% by weight of the graft copolymer (A) and 40 to 80% by weight of the matrix resin (B).

3. The thermoplastic resin composition according to claim 1, wherein, based on 100% by weight in total of the graft copolymer (A), the graft copolymer (A) comprises 40 to 70% by weight of the alkyl acrylate rubber core and 30 to 60% by weight of the copolymer shell.

4. The thermoplastic resin composition according to claim 1, wherein, based on 100% by weight in total of the graft copolymer (A), the graft copolymer (A) comprises 1 to 20% by weight of a polymer seed comprising one or more selected from the group consisting of an alkyl(meth) acrylate, an aromatic vinyl compound, and a vinyl cyanide compound, 35 to 65% by weight of the alkyl acrylate rubber core, and 30 to 60% by weight of the copolymer shell.

5. The thermoplastic resin composition according to claim 1, wherein the recycled polystyrene comprises any one selected from the group consisting of recycled non-foamed polystyrene, recycled foamed polystyrene, and a mixture thereof.

6. The thermoplastic resin composition according to claim 1, wherein the recycled polystyrene has a weight average molecular weight of 100,000 to 350,000 g/mol.

7. The thermoplastic resin composition according to claim 1, wherein the matrix resin (B) further comprises general-purpose polystyrene.

8. The thermoplastic resin composition according to claim 1, wherein the matrix resin (B) further comprises, based on 100 % by weight in total of the matrix resin (B), 1 to 15% by weight of an aromatic vinyl compound-vinyl cyanide compound copolymer comprising 75 to 95% by weight of an aromatic vinyl compound and 5 to 25% by weight of a vinyl cyanide compound.

9. The thermoplastic resin composition according to claim 1, wherein the thermoplastic resin composition further comprises an alkyl acrylate-aromatic vinyl compound-vinyl cyanide compound graft copolymer (C) containing an alkyl acrylate rubber core having an average particle diameter of greater than 200 nm and 500 nm or less and an aromatic vinyl compound-vinyl cyanide compound copolymer shell.

10. The thermoplastic resin composition according to claim 9, wherein, based on 100 parts by weight in total of the graft copolymer (A) and the matrix resin (B), the graft copolymer (C) is comprised in an amount of 0.1 to 12 parts by weight.

11. The thermoplastic resin composition according to claim 1, wherein, based on 100 parts by weight in total of the graft copolymer (A) and the matrix resin (B), the thermoplastic resin composition comprises a light stabilizer (D) in an amount of 0.1 to 7 parts by weight.

12. The thermoplastic resin composition according to claim 1, wherein the thermoplastic resin composition has a heat deflection temperature (HDT) of 82° C. or higher as measured under a load of 18.5 kgf according to ASTM D 648.

13. The thermoplastic resin composition according to claim 1, wherein the thermoplastic resin composition has a tensile strength of 400 kgf/cm$^2$ or more as measured at a rate of 50 mm/min according to ASTM D 638.

14. A method of preparing a thermoplastic resin composition, comprising kneading and extruding an alkyl acrylate-aromatic vinyl compound-vinyl cyanide compound graft copolymer (A) containing an alkyl acrylate rubber core having an average particle diameter of 60 to 200 nm and an aromatic vinyl compound-vinyl cyanide compound copolymer shell, and a matrix resin (B) at 180 to 300° C. and 100 to 400 rpm, wherein the copolymer shell of the graft copolymer (A) comprises 85 to 99% by weight of an aromatic vinyl compound and 1 to 15% by weight of a vinyl cyanide compound based on 100 % by weight total of the copolymer shell and has a weight average molecular weight of 100,000 to 400,000 g/mol, and the matrix resin (B) comprises 50 to 90% by weight of recycled polystyrene and 8 to 50% by weight of a polyarylene oxide based on 100 % by weight in total of the matrix resin (B).

15. A molded article, comprising the thermoplastic resin composition according to claim 1.

* * * * *